No. 771,377. PATENTED OCT. 4, 1904.
C. LUDLOFF.
BEEHIVE.
APPLICATION FILED NOV. 18, 1903.
NO MODEL. 2 SHEETS—SHEET 1.
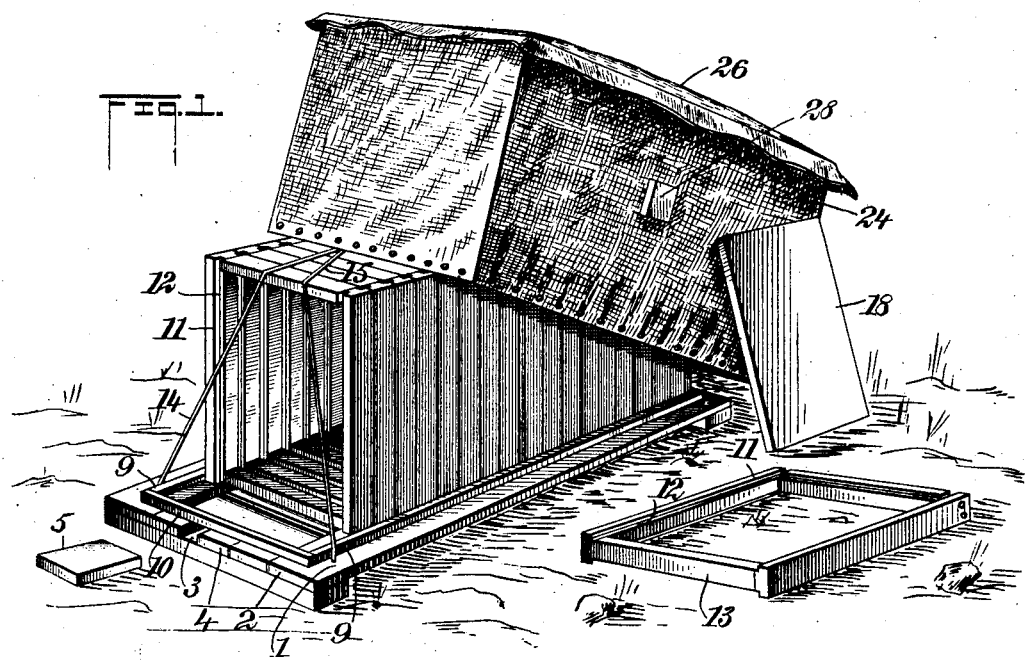
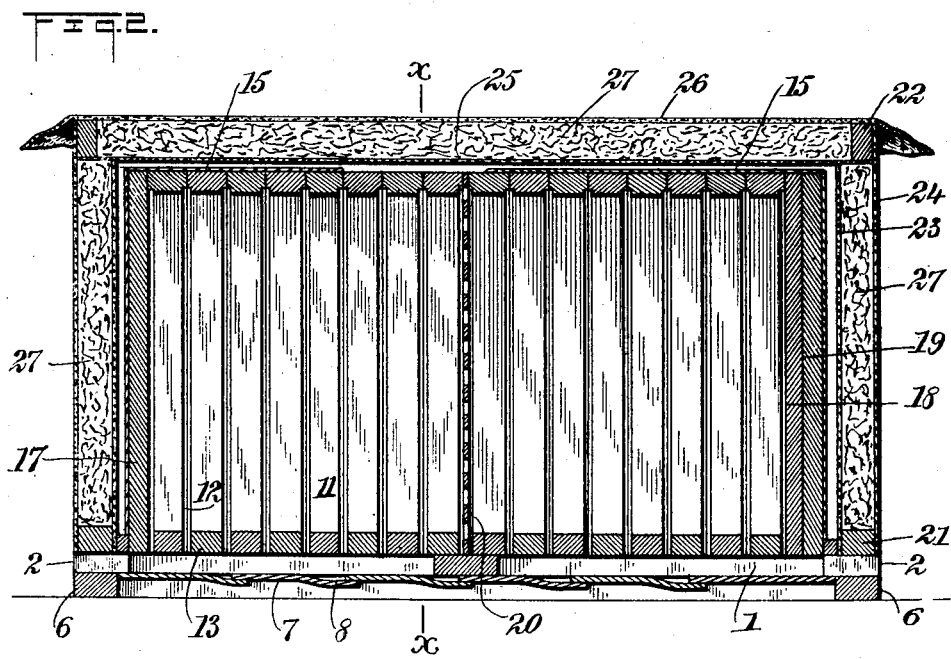
WITNESSES:
INVENTOR
Carl Ludloff
BY
ATTORNEYS

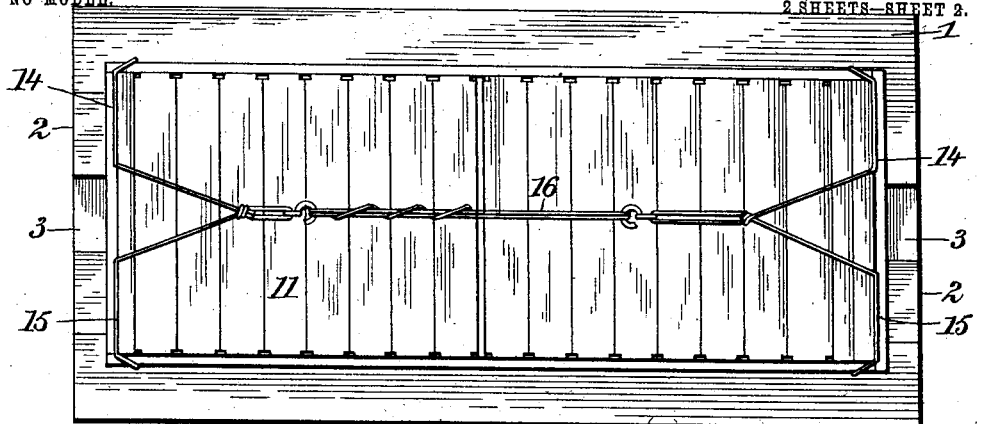
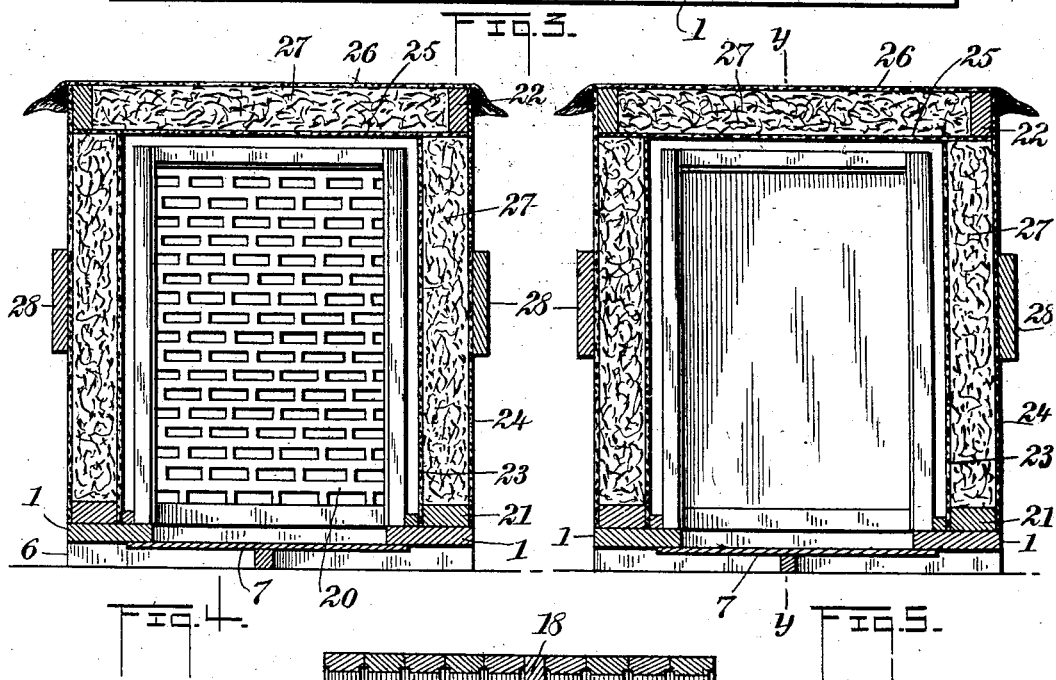
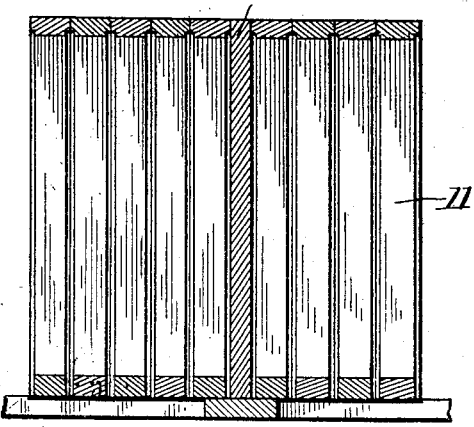

No. 771,377. Patented October 4, 1904.

UNITED STATES PATENT OFFICE.

CARL LUDLOFF, OF SAN PEDRO DE LOS PINOS, MEXICO.

BEEHIVE.

SPECIFICATION forming part of Letters Patent No. 771,377, dated October 4, 1904.

Application filed November 18, 1903. Serial No. 181,628. (No model.)

*To all whom it may concern:*

Be it known that I, CARL LUDLOFF, a citizen of the United States, and a resident of San Pedro de los Pinos, D. F., Mexico, have invented a new and Improved Beehive, of which the following is a full, clear, and exact description.

This invention relates to improvements in beehives, an object being to provide a beehive of simple construction and particularly adapted for use in places where there are sudden changes of temperature—such, for instance, as in the high tablelands of Mexico, where hot days are followed by cold nights—and which cause in all countries of those climatic conditions considerable loss of bee swarms every year by spring-dwindling if the bees are kept in hives of a construction and material which allow the sudden changes of the outer temperature to influence the life of the bees in their habitations. This may be explained by the following: In the early springtime bee swarms die out because the old bees who are destined to live over winter into spring until a new generation of working-bees has been raised by the old bees to take their places in the hive are induced by the warm temperature which penetrates the walls of their hives to exert a premature activity, shortening their lives. In consequence of this the hive becomes desolate and queen and brood must starve. The occurrence of spring-dwindling, the greatest scourge of apiculture in the United States, is nothing more nor less than the direct consequence of the unfitted construction and material of the hives now generally in use in that country in regard to the given climatic conditions. The damage caused by spring-dwindling in the United States amounts yearly to one-quarter to one-third, sometimes even more, of all the swarms owned by bee-keepers, and the total loss may aggregate to millions of dollars every year. One observes the ravages alone by spring-dwindling mainly in the mountainous parts of the country, being those territories in which nature provides the best kinds of honey of the finest taste and flavor, and being therefore of high commercial value. Doing away with spring-dwindling, as the introduction and use of my hive undoubtedly warrants according to two years practical tests, means a considerable increase of the national wealth by the increase of the number of hives, a greater production of honey in each one of the hives, and an easier management of the apiaries.

I will describe a beehive embodying my invention and then point out the novel features in the appended claims.

Reference is to be had to the accompanying drawings, forming a part of this specification, in which similar characters of reference indicate corresponding parts in all the figures.

Figure 1 is a perspective view of a beehive embodying my invention, showing it partly dismembered. Fig. 2 is a sectional elevation thereof. Fig. 3 is a plan view with the cover removed. Fig. 4 is a section on the line $x$ $x$ of Fig. 2. Fig. 5 is a section showing a solid partition for dividing the hive into compartments, and Fig. 6 is a section on the line $y$ $y$ of Fig. 5.

The base of the hive consists of a frame having side members 1 and end members 2, the said end members having openings 3, through which bees may pass either inward or outward, and it may be here stated that these openings may be regulated as to size by placing a block 4 therein, which will leave a space only sufficiently large to permit one bee to pass at a time, or the spaces may be entirely closed by larger blocks 5.

Secured to the end members of the base-frame, so as to support the same above the ground or the like, are cleats 6. Such raising of the base-frame will permit air to pass underneath.

Secured to the base-frame are thin bottom boards 7, the edges of the boards overlapping, so as to provide slight openings 8 at the ends, through which air may pass. Attached to the upper sides of the side members 1 of the frame and spaced somewhat inward from the inner edges thereof are side strips 9, and end strips 10 are secured to the ends of the base-frame and spaced slightly inward from the inner edges thereof. Designed to be removably supported on the base-frame and between the said strips 9 are the comb-frames 11. The side members and upper members of the comb-frames are channeled on the sides, as indicated at 12. These channels serve to receive propolis deposited by the bees, which helps to make the compartments air-tight, and at the same time, as the propolis is very sticky when warm, as it always is in hives, it will prevent the bees from crawling over the frame and the hands when the frame is taken out for inspection of the work of the bees.

It will be noted that the bottom strips 13 of each frame are somewhat narrower than the other strips of the frames in order to allow the bees to enter from the bottom board to the combs.

The several honey-frames placed close together are held in position, as here shown, by tie cords or ropes, which pass upward against the end members and over the top. The end portions of these tie-ropes consist of two members 14 15, one member connecting with said base-frame at one side and the other member connecting with said base-frame at the other side, and the two members are joined together at the top, and the members of opposite ends are secured together by a draw-cord 16, engaging with hooks on the end cords, as shown. It is to be understood, however, that the invention is not confined to any particular means for holding the frames in position, as it is obvious that other devices than that shown may be used.

17 18 19 indicate partition-boards of the size of the comb-frames. These partition-boards are designed to separate a hive into separate compartments, which form independent hives or nests for the bees. When one of these boards is placed at the center, as indicated in Figs. 5 and 6, and one is placed at each end, there are practically two hives employed. These division-boards are practically used to keep the bees warm in their compartments and allow the bee-keeper either to extend or to contract the brood and honey chamber according to necessity, and by using these boards the bees do not need to warm spaces for which they have no use. As the warm temperature in a hive can only be produced by the bees consuming greater quantities of honey, the application of these boards means the saving of a large amount of honey. Furthermore, as a considerable increase of bees can only be expected if the hive is warm the use of these boards warrants a two to three times greater increase of bees than in other hives. At a suitable point a perforated zinc plate 20 is placed, the perforations of which are sufficiently small to prevent the queen bee from passing through to the honey-room of the hive.

When the parts are assembled as above described, the hive is to be protected from the rain by means of a cover removably supported on the outwardly-extended portions of the base-frame. This cover consists as a whole of any suitable material which is a poor conductor of temperature, at the same time keeping out moisture and rain. As here shown, it comprises a lower rectangular frame 21 and an upper rectangular frame 22, connected by corner-posts. Secured to the frames are inner walls 23, consisting of paper or other suitable light material, and outer walls 24, consisting of a light material, such as canvas made impervious to the passage of heat or cold. The cover also has an inner top wall 25, similar to the side and end walls 23, and an upper top wall 26, similar to the walls 24. The edges of the top wall 26 are extended outward, so as to shed moisture or rain.

The several walls above described are spaced apart and the spaces are packed with a material 27 suitable for resisting cold or to maintain an even temperature. This filling material may consist of fine shavings, excelsior, or the like. The several inner walls, it will be noted, are spaced somewhat from the comb-frames, so that there is a clear passage for warm air, and the side portions of the cover are provided with handles 28, by means of which the cover may be readily raised or lowered.

The improved hive is distinguished not only by its special construction, as above described, but also by the following advantages: Essentially and as a whole it is composed of a set of carriers or comb-frames conveniently set and which can be drawn out through the top or through both ends at once and can be handled like the leaves of a book, of course after releasing the drawing-cord. All this handling is done without troubling the bees already in their respective homes or in any part of the hive. Its construction allows the hermetically closing and separating of the empty frames from those already inhabited.

In the inside of the hives is preserved the necessary temperature, a thing of the greatest importance in countries like Mexico that are at a certain height above the sea-level, having hot days and cold nights. It may also be said that vermin cannot exist in this kind of hive, because the bees do not suffer from low temperature and are always able to defend themselves and their work against any enemy of that class. The bees are sheltered from wind and rain on account of the suitable material covering the hive, and yet there is a constant ventilation through the base and around the sides of the comb-frames.

As before stated, the cover may be of any suitable material which is a poor conductor of temperature, at the same time keeping out moisture and rain. An essential feature is the dead-air space between the cover and hive proper, which keeps the bees protected from sudden changes in the outer temperature and enables them to maintain easily that degree of temperature necessary for their welfare.

Having thus described my invention, I claim as new and desire to secure by Letters Patent—

1. A beehive comprising a base-frame, bottom boards attached to said frame and having their edges overlap providing openings at the ends, a plurality of comb-frames removably supported on said base-frame one against another, and a cover for passing over said frames and resting on the base-frame.

2. A beehive comprising a base-frame having ventilation-openings and also having openings at the ends for the ingress and egress of bees, blocks for entirely closing said openings, blocks for partially closing said openings, a plurality of comb-frames supported on the base-frame, the said comb-frames being arranged one against another, and a cover for passing over the comb-frames and resting on the base-frame.

3. A beehive comprising a base consisting of overlapped boards, providing openings at the ends, a plurality of comb-frames removably supported close together on said base, a perforated plate adapted to be placed between the comb-frames, and a removable cover for the hive.

In testimony whereof I have signed my name to this specification in the presence of two subscribing witnesses.

CARL LUDLOFF.

Witnesses:
   A. W. GOBRECHT,
   EDWARD M. CONLEY.